US008015439B2

(12) United States Patent
Mukker et al.

(10) Patent No.: US 8,015,439 B2
(45) Date of Patent: Sep. 6, 2011

(54) METHOD FOR HANDLING MORE THAN A MAXIMUM NUMBER OF SUPPORTED DRIVES IN A RAID CONFIGURATION

(75) Inventors: Atul Mukker, Suwanee, GA (US);
Charles E. Nichols, Wichita, KS (US);
Daniel G Samuelraj, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 865 days.

(21) Appl. No.: 12/070,413

(22) Filed: Feb. 19, 2008

(65) Prior Publication Data
US 2009/0210619 A1 Aug. 20, 2009

(51) Int. Cl.
*G06F 11/00* (2006.01)
(52) U.S. Cl. ...................... 714/6.22; 713/100
(58) Field of Classification Search .................. None
See application file for complete search history.

(56) References Cited

U.S. PATENT DOCUMENTS

| | | | | |
|---|---|---|---|---|
| 5,950,230 A * | 9/1999 | Islam et al. | ................... | 711/156 |
| 6,098,119 A * | 8/2000 | Surugucchi et al. | ............ | 710/10 |
| 6,311,232 B1 * | 10/2001 | Cagle et al. | ........................ | 710/8 |
| 6,836,832 B1 * | 12/2004 | Klinkner | ....................... | 711/170 |
| 6,952,794 B2 * | 10/2005 | Lu | ...................................... | 714/7 |
| 7,043,622 B2 * | 5/2006 | Henry et al. | ................... | 711/203 |
| 7,206,991 B2 * | 4/2007 | Chatterjee et al. | ............ | 714/770 |
| 7,424,637 B1 * | 9/2008 | Schoenthal et al. | .............. | 714/6 |
| 2004/0068672 A1 * | 4/2004 | Fisk et al. | ...................... | 713/323 |
| 2005/0188257 A1 * | 8/2005 | Morita | ............................. | 714/13 |
| 2006/0095667 A1 * | 5/2006 | Suzuki et al. | ................. | 711/114 |
| 2006/0248378 A1 * | 11/2006 | Grcanac et al. | ................... | 714/6 |
| 2008/0140930 A1 * | 6/2008 | Hotchkiss | ..................... | 711/114 |

\* cited by examiner

*Primary Examiner* — Gabriel L Chu
(74) *Attorney, Agent, or Firm* — Suiter Swantz pc llo

(57) ABSTRACT

The present invention is a method for handling disk drives in a Redundant Array of Inexpensive Disks (RAID) configuration. The method may include detecting a disk drive received via insertion of the disk drive in a disk drive slot of an enclosure of the RAID configuration. Prior to the disk drive being received, it may be that fewer than a maximum number of supported disk drives are configured. It may also be the case that, after the disk drive is received, no more than the maximum number of supported drives are in-place within the enclosure of the RAID configuration. In such instances, and when the insertion is a cold insertion into an empty disk drive slot, the method may further include marking the disk drive as Un-configured good alias Ready. Further, if the disk drive is inserted into a missing disk drive slot and has a smaller storage capacity than that of the replaced disk drive previously in place within the missing disk drive slot, the method may further include marking the disk drive as FAIL. Still further, if the disk drive is inserted into a missing disk drive slot and has the same storage capacity or larger storage capacity than the replaced disk drive, the method may further include marking the disk drive as FAIL or RBLD based on an Auto Rebuild flag.

20 Claims, 4 Drawing Sheets

METHOD FOR HANDLING MORE THAN A MAXIMUM NUMBER OF SUPPORTED DRIVES IN A RAID CONFIGURATION

FIELD OF THE INVENTION

The present invention relates to the field of electronic data storage and particularly to a method for handling more than a maximum number of supported drives in a RAID (Redundant Array of Inexpensive Disks) configuration.

BACKGROUND OF THE INVENTION

RAID stack implementations often have intrinsic limits on the number of supported disk drives to create RAID configurations. These intrinsic limits may only be imposed internally and logically within the stack software. Current implementations may not prevent a user from actually hooking up more than the maximum number of supported disk drives. Hooking up or connecting more than the maximum number of supported disk drives may create various permutations and combinations within the RAID stack software and, with current designs and implementations, may cause unexpected results (such as data loss or data unavailability), may promote a confusing user experience, may impose limits on how computer hardware may be designed, and the like.

Therefore, it may be desirable to provide a method for handling more than a maximum number of supported drives in a RAID configuration.

SUMMARY OF THE INVENTION

Accordingly, an embodiment of the present invention is directed to a method for handling disk drives in a Redundant Array of Inexpensive Disks (RAID) configuration, including: detecting a disk drive received via insertion of the disk drive in a disk drive slot of an enclosure of the RAID configuration; when the insertion is a cold insertion into an empty disk drive slot, and when prior to the disk drive being received, fewer than a maximum number of supported disk drives are configured and, when after the disk drive is received, no more than the maximum number of supported drives are in-place, marking the disk drive as Un-configured good alias Ready; when the insertion is a cold insertion into a missing disk drive slot, and when prior to the disk drive being received, fewer than a maximum number of supported disk drives are configured and, when after the disk drive is received, no more than the maximum number of supported drives are in-place, and when the inserted disk drive has a smaller storage capacity than a storage capacity of a replaced disk drive which was previously in-place within the missing disk drive slot, marking the disk drive as FAIL; and when the insertion is a cold insertion into a missing disk drive slot, and when prior to the disk drive being received, fewer than a maximum number of supported disk drives are configured and, when after the disk drive is received, no more than the maximum number of supported drives are in-place, and when the inserted disk drive has a same storage capacity or larger storage capacity than a replaced disk drive which was previously in-place within the missing disk drive slot, marking the disk drive as FAIL or RBLD based on an Auto Rebuild flag.

A further embodiment of the present invention is directed to a method for handling disk drives in a Redundant Array of Inexpensive Disks (RAID) configuration, including: detecting a disk drive received via insertion of the disk drive in a first disk drive slot of an enclosure of the RAID configuration, said first disk drive slot having not previously been occupied by a configured disk drive; and when the insertion is a cold insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration, said disk drive having been configured when it occupied the second disk drive slot and said removal having been a hot removal, providing a message to a user, said message requesting that the received disk drive be removed.

An additional embodiment of the present invention is directed to a computer-readable medium having computer-executable instructions for performing a method for handling disk drives in a Redundant Array of Inexpensive Disks (RAID) configuration, said method including: detecting a disk drive received via insertion of the disk drive in a disk drive slot of an enclosure of the RAID configuration; when the insertion is a cold insertion into an empty disk drive slot, and when prior to the disk drive being received, fewer than a maximum number of supported disk drives are configured and, when after the disk drive is received, no more than the maximum number of supported drives are in-place, marking the disk drive as Un-configured good alias Ready; and when the insertion is a cold insertion into a missing disk drive slot, and when prior to the disk drive being received, fewer than a maximum number of supported disk drives are configured and, when after the disk drive is received, no more than the maximum number of supported drives are in-place, and when the inserted disk drive has a smaller storage capacity than a storage capacity of a replaced disk drive which was previously in-place within the missing disk drive slot, marking the disk drive as FAIL.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1A:
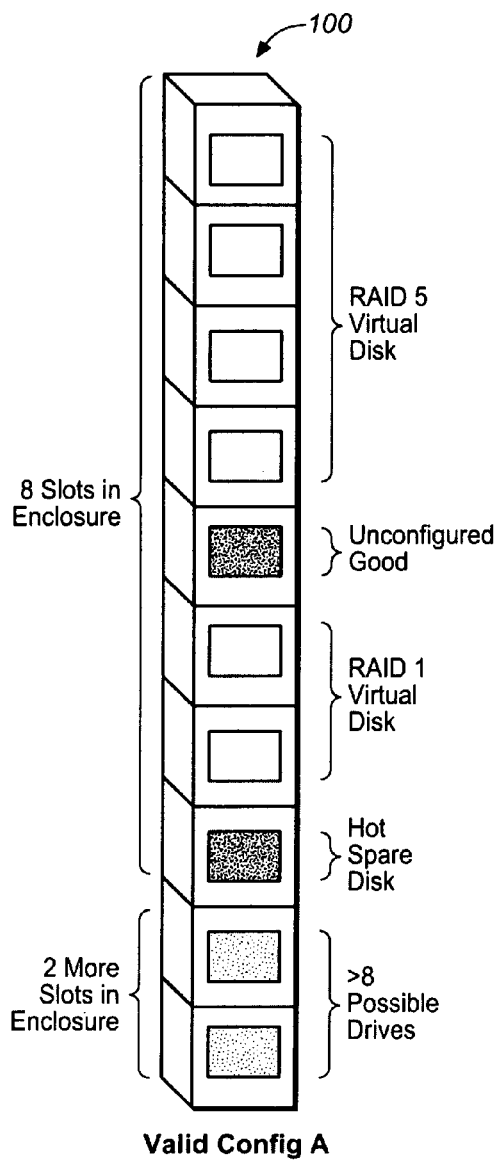
FIG. 1A is an illustration of a first example of a valid RAID stack configuration/implementation.

Reference will now be made in detail to the presently preferred embodiments of the invention, examples of which are illustrated in the accompanying drawings.

Redundant Array of Inexpensive Disks (RAID) stack implementations often have intrinsic limits on the number of supported disk drives to create RAID configurations. These intrinsic limits may only be imposed internally and logically within the stack software. Current implementations may not prevent a user from actually hooking up more than the maximum number of supported disk drives. Hooking up or connecting more than the maximum number of supported disk drives may create various permutations and combinations within the RAID stack software and, with current designs and implementations, may cause unexpected results (such as data loss or data unavailability), may promote a confusing user experience, may impose limits on how computer hardware may be designed, and the like. A passive solution for this problem may be to document the intrinsic limits (ex.—the maximum number of supported disk drives) in a user guide for the RAID stack. For example, text in the user guide may recommend that users not connect more than the maximum number of supported disk drives. Further, said text may also warn users about the possible unexpected results, such as loss of user data, when more than the maximum number of supported disk drives are connected.

One problem with the passive solution described above is that it may not provide as unambiguous of a warning to a user as may be desired and thus, may not be the best way to prevent the user from connecting more than the max number of supported disk drives and possibly encountering data loss. Another problem with the above-described passive solution is that it leaves it to the user to self-impose the limit on how many disk drives may be connected to the RAID system (ex—the RAID stack implementation, RAID configuration, etc.). Further, due to the limitation on the number of disk drives which may be connected, the user may not be able to use all of the available hardware of the RAID system (which is associated with the overall cost of the RAID system). Additionally, system manufacturers may be limited in how they can design a computer system including the RAID stack implementation. For instance, manufacturers may design it to attempt to prevent end users from connecting, when they would rather design it such that software of the system may self-configure based on a currently available hardware configuration. Still further, a user may not understand why only a subset of available hardware of the system may be configured, which may result in a bad user experience.

The present invention may include an algorithm design which may be implemented in software components of RAID stacks. Said software components may include RAID pre-boot Basic Input/Output System (BIOS), pre-boot configuration utilities, RAID stack device drivers and/or RAID firmware. In an exemplary embodiment of a RAID stack configuration, the number of max supported disk drives in a RAID configuration may be eight. In alternative embodiments, this number or base limit may various other values. In exemplary embodiments, it may be assumed that a user may be able to connect the devices (disk drives) in any available slot of a disk drive enclosure of a RAID configuration as long as the total number of connected disk drives does not exceed the max supported number (ex.—eight) and that none of the slots where disk drives may be connected would be explicitly made inaccessible. Further, in exemplary embodiments, a restriction may be imposed that no more than the max supported number of disk drives may be connected while the computer system (which includes the RAID system/RAID configuration/RAID stack implementation) is booting up. However, once said system is up and running, a user may be allowed to hotplug extra drives to the system.

Figure 1B:
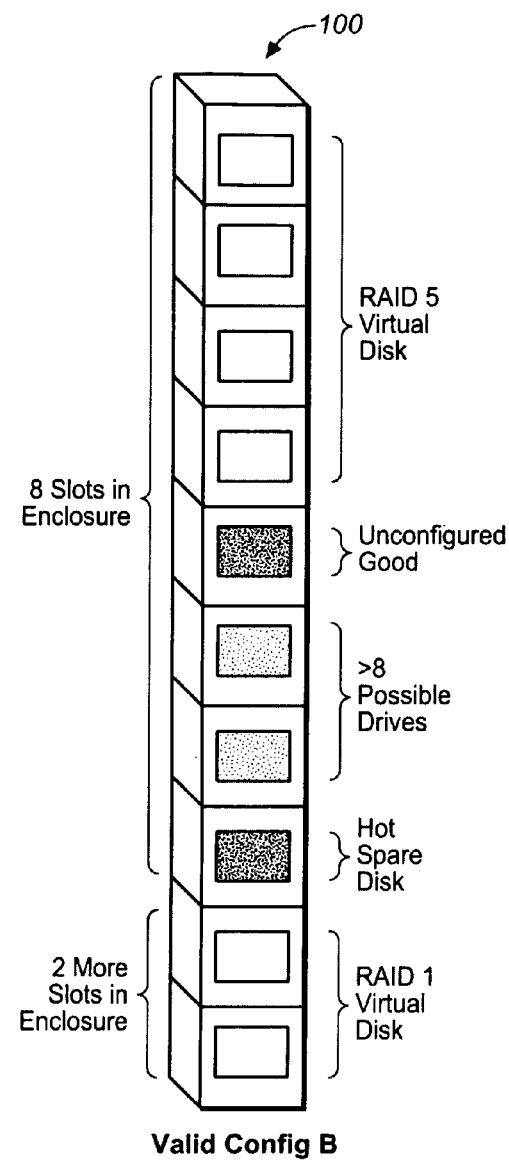
FIG. 1B is an illustration of a second example of a valid RAID stack configuration/implementation.

RAID stacks may have two different representations of a disk drive/disk/drive. One representation may relate to the actual physical presence of the disk, while the other representation may relate to the logical state of the disk. FIGS. 1A and 1B each depict a view of exemplary RAID stack configurations/implementations. In the illustrated implementations, each expander/enclosure of the RAID stack configuration 100 includes more than 8 available slots (ex.—10 slots). The physical presence/physical state of a drive may mean simply that the drive is connected and responding properly on a given enclosure slot. The logical state of a drive may associate RAID operations to that drive's virtual disk (and all logical drives in an array to which a physical drive belongs). In an exemplary embodiment, RAID stack software may stop trying to discover more disk drives in its configuration if the maximum supported number has already been discovered. For example, in FIG. 1A, the maximum number of supported drives (ex.—eight) may be connected, such that a disk drive may be connected in each of the first eight drive slots (counting from top to bottom along the enclosure). Further, if a user attempts to connect an additional disk drive in either the ninth or tenth drive slot, the ninth disk drive would be ignored by the scan performed by the RAID stack software and would not affect configuration resolution.

In FIG. 1B, the maximum number of supported drives may be connected, such that a disk drive may be connected in each of the first five drive slots and each of the last three drive slots (counting from top to bottom along the enclosure of the RAID stack configuration 100). Further, if a user attempts to connect an additional disk drive in either the sixth or seventh slot, the disk drive in the tenth slot would be ignored by the scan performed by the RAID stack software, which may cause RAID 1 to transition to a degraded state. In exemplary embodiments, a logical representation of the RAID 1 failed drive may be included in the logic driver (ex.—MegaSR) stack software state, thereby causing the stack to account for nine logical states. In further embodiments, if the RAID stack software scan detects an unrelated configuration on the additional disk drive (ex.—the wrongly inserted drive), a configuration resolution failure may result and BIOS may request user intervention to remove the offending drive.

Figure 2:
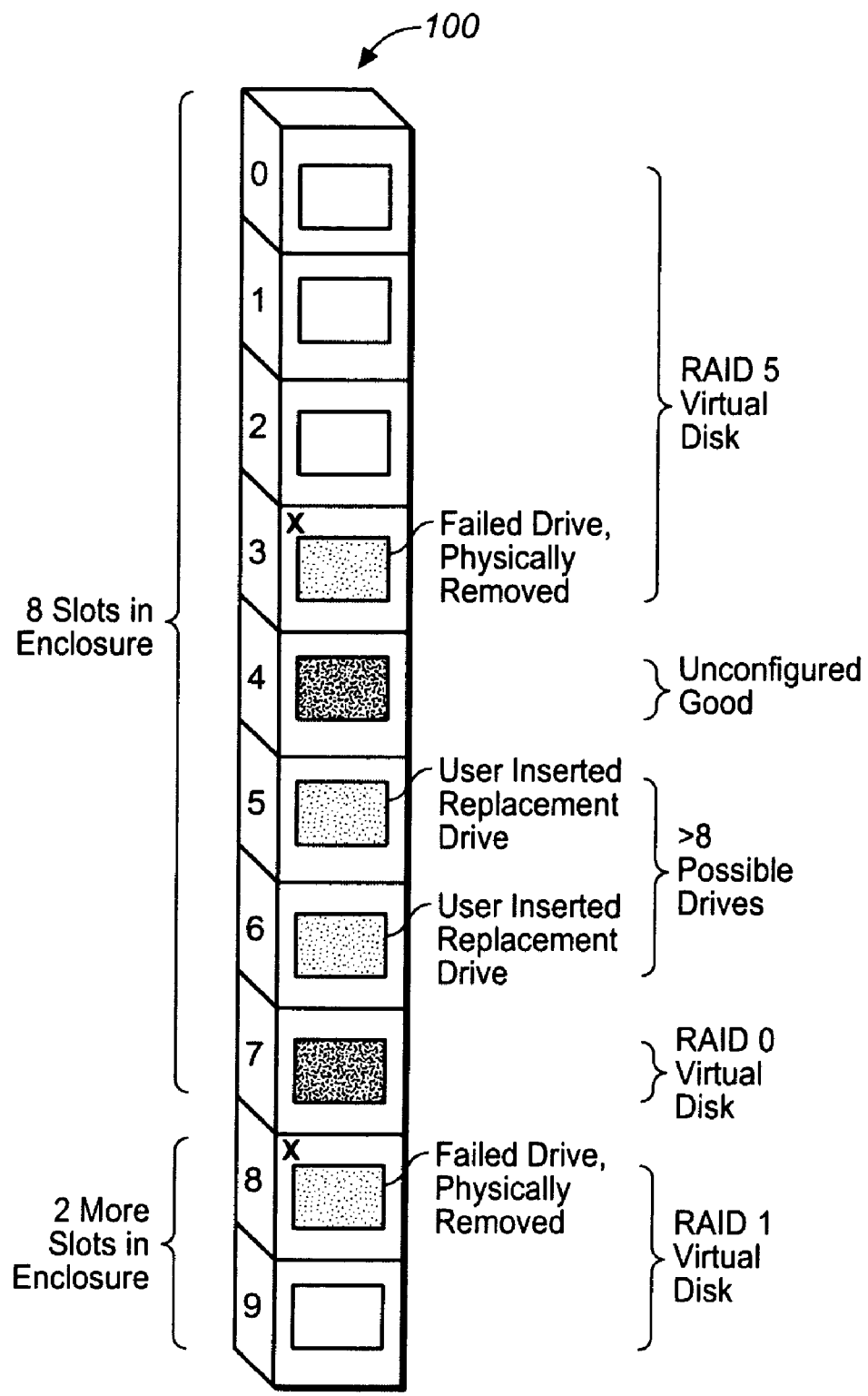
FIG. 2 is an illustration of an invalid RAID stack configuration/implementation.

FIG. 2 shows an alternative exemplary embodiment of a RAID stack configuration 100. In FIG. 2, the RAID stack configuration 100 is an unsupported RAID stack configuration, as it depicts that disk drives have been removed from two of the enclosure slots and replacement disk drives were placed in the additional (empty) slots rather than in the slots from which the removed disk drives were removed (ex.—missing slots). Replacing disk drives in such a manner may prevent the RAID stack configuration, such as the configuration 100 shown in FIG. 2, from being able to rebuild the array(s). The above-described scenario in which a user is forced to insert replacement drives into original (missing) drive slots rather than in the additional (empty) drive slots in order for the array(s) of the RAID stack configuration 100 to be rebuilt may be less than ideal if the original drive slots are faulty/damaged. In an exemplary embodiment of the present invention, adding new replacement drives in the manner shown in FIG. 2, would result in a valid configuration. In further embodiments, a user may be able to configure the new drives in new configurations. For example, in the present invention, if drive replacement occurs on a live system, such as via a hotplug mechanism, logical drive state transition would occur and the newly inserted drives would be marked unconfigured good/would transition to an unconfigured good state (if the newly inserted drives were blank). Alternatively, if the newly inserted drives had an unrelated configuration, BIOS may request user intervention to resolve configuration. In further embodiments, if existing drives of a configuration are moved between slots, the drive stack software scan would result in an automatic roaming. In still further embodiments, a user may be able to degrade existing virtual disks and for new virtual disks to be created using only the newly added disks, or the newly added disks may be configured as hotspare by a user and the degraded disks/array(s) may be rebuilt. Further, pre-boot configuration utility may be configured to not display physically absent devices/disks via a display, such as a Graphical User Interface (GUI) console. Still further, RAID software stacks may be configured to perform an explicit bus scan to seek new devices if a disk drive of the configuration 100 fails.

In alternative exemplary embodiments, if disk drive replacement were performed as shown in FIG. 2, RAID stack software may be configured to force an affinity on the additional drives. For example, the replacement drives may be forcibly affiliated to an appropriate virtual disk/virtual disk volume (either RAID 5 or RAID 1, volumes to which the removed disks belonged) depending on a pre-determined criterion, which may be documented in a RAID user guide. Replacement drives may be actively sought by RAID stack software, either by reboot, manual hotplug sequence, extra design code and/or code to perform a bus scan whenever failed device detection occurs.

Figure 3:
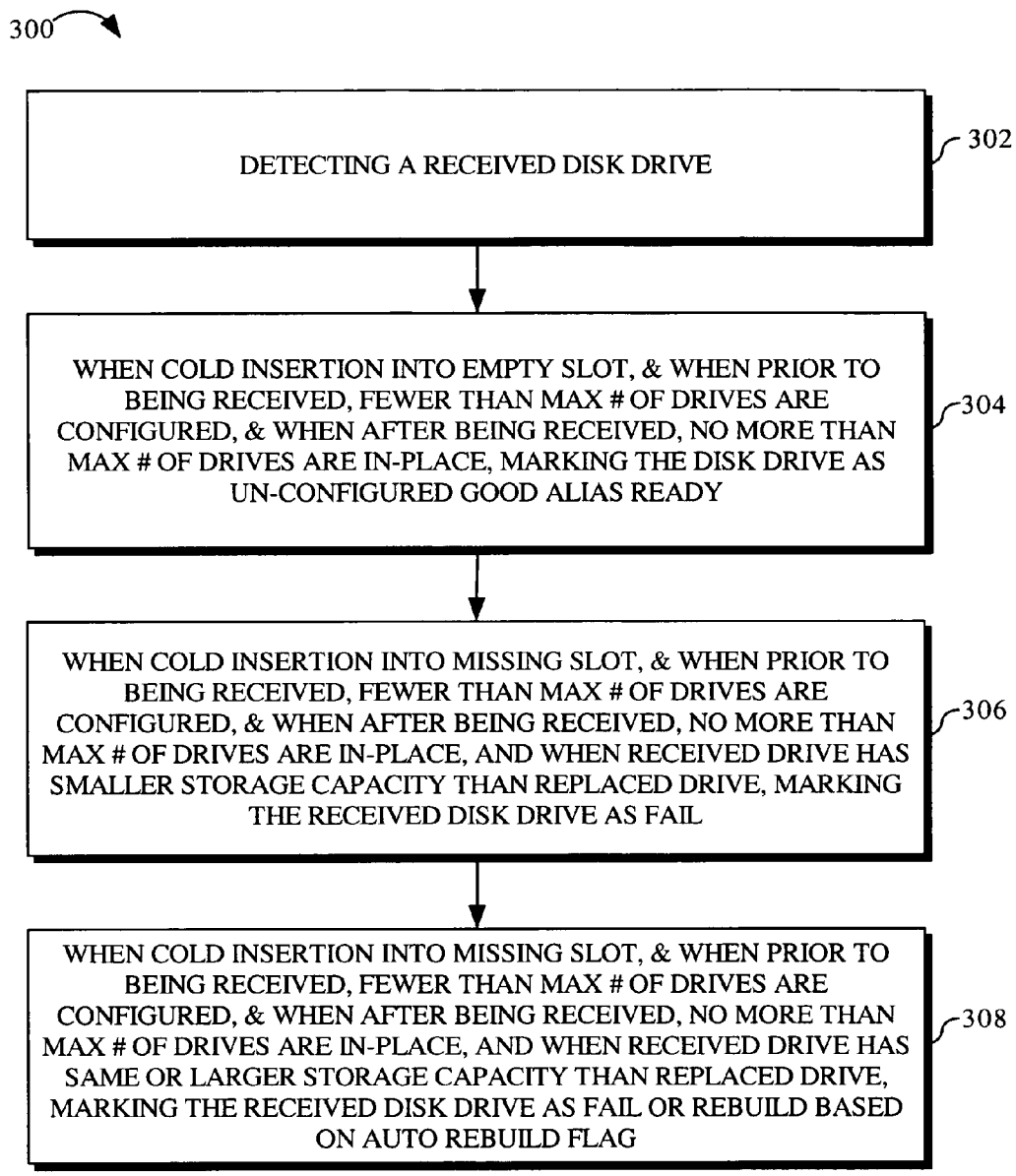
FIG. 3 is a flow chart illustrating a method for handling disk drives in a Redundant Array of Inexpensive Disks (RAID) configuration in accordance with an exemplary embodiment of the present invention.

FIG. 3 is a flowchart illustrating a method for handling disk drives in a Redundant Array of Inexpensive Disks (RAID) configuration in accordance with an exemplary embodiment of the invention. The method 300 may include detecting a disk drive received via insertion of the disk drive in a disk drive slot of an enclosure of the RAID configuration 302. In exemplary embodiments, when the insertion is a cold insertion into an empty disk drive slot (ex.—when the drive is added to the configuration, rather than replacing a previous drive of the configuration) and, when prior to the disk drive being received, fewer than a maximum number of supported disk drives are configured and, when after the disk drive is received, no more than the maximum number of supported drives are in-place, the method 300 may further include marking the disk drive as Un-configured good alias Ready (which may be a soft state only) 304.

In further embodiments, when the insertion is a cold insertion into a missing disk drive slot (ex.—when the drive is replacing a drive which was previously included in the configuration) and, when prior to the disk drive being received, fewer than a maximum number of supported disk drives are configured and, when after the disk drive is received, no more than the maximum number of supported drives are in-place and, when the inserted disk drive has a smaller storage capacity than a storage capacity of a replaced disk drive which was previously in-place within the missing disk drive slot, the method 300 may further include marking the disk drive as FAIL 306. This may occur regardless of whether AutoRebuild is enabled or disabled. In additional embodiments, when the insertion is a cold insertion into a missing disk drive slot and, when prior to the disk drive being received, fewer than a maximum number of supported disk drives are configured and, when after the disk drive is received, no more than the maximum number of supported drives are in-place and, when the inserted disk drive has a same storage capacity or larger storage capacity than a replaced disk drive which was previously in-place within the missing disk drive slot, the method 300 may further include marking the disk drive as FAIL or RBLD (RBLD may stand for Rebuild) based on an Auto Rebuild flag 308.

In additional embodiments, when the insertion is a hot, pre-boot insertion or a hot, post-boot insertion into an empty disk drive slot and, when prior to the disk drive being received, fewer than a maximum number of supported disk drives are configured and, when after the disk drive is received, no more than the maximum number of supported disk drives are in-place, the method 300 may further include marking the disk drive as Un-configured good 310. In exemplary embodiments, when the insertion is a hot, pre-boot insertion into a missing disk drive slot and, when prior to the disk drive being received, fewer than a maximum number of supported disk drives are configured and, when after the disk drive is received, no more than the maximum number of supported drives are in-place, the method 300 may further include marking the disk drive as FAIL or RBLD based on an Auto Rebuild flag 312.

In further embodiments, when the insertion is a cold insertion and, when prior to the disk drive being received, a maximum number of supported disk drives are configured and in-place within the enclosure, the method 300 may further include providing a message to a user, said message requesting that the received disk drive be removed 314. For example, the message may be provided as text via a display, such as a Graphical User Interface (GUI), of a computer system implementing the RAID configuration. Further, boot up and entry into a configuration utility may be prevented until the received disk drive is removed. In additional embodiments, when the insertion is a hot, pre-boot insertion and, when prior to the disk drive being received, a maximum number of supported disk drives are configured and in-place within the enclosure, the method 300 may further include allowing functioning of a configuration utility with the configured disk drives 316.

In exemplary embodiments, when the insertion is a hot, post-boot insertion and, when prior to the disk drive being received, a maximum number of supported disk drives are configured and in-place within the enclosure, the method 300 may further include preventing use of the received drive and providing a message to a user that more disk drives are present in the RAID configuration than are supportable by the RAID configuration 318. In further embodiments, when the insertion is a hot, pre-boot insertion and, when prior to the disk drive being received, a maximum number of supported disk drives are configured and in-place, an additional unusable disk drive is in-place, and a disk drive included in the configured disk drives is removed, the method 300 may further include providing a message to a user, said message requesting that the received disk drive be removed 320. Further, boot up and entry into a configuration utility may be prevented until the received disk drive is removed. In still further embodiments, when the insertion is a hot, pre-boot insertion or a hot, post-boot insertion and, when prior to the disk drive being received, a maximum number of supported disk drives are configured and in-place, an additional unusable disk drive is in-place, and a disk drive included in the configured disk drives is removed, the method 300 may further include marking the received disk drive as unconfigured good 322.

Figure 4:
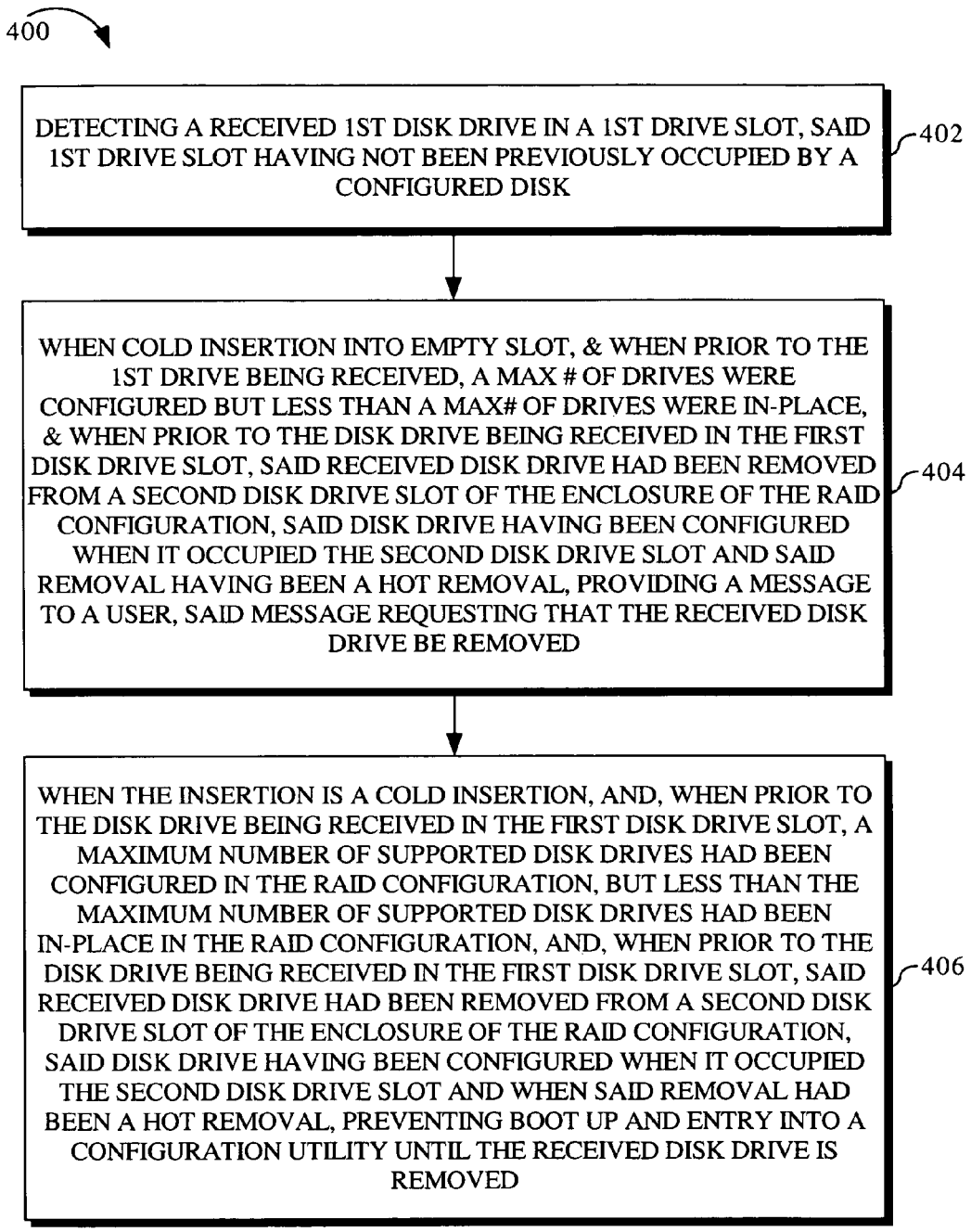
FIG. 4 is a flow chart illustrating a method for handling disk drives in a Redundant Array of Inexpensive Disks (RAID) configuration in accordance with an alternative exemplary embodiment of the present invention.

FIG. 4 a flowchart illustrating a method for handling disk drives in a Redundant Array of Inexpensive Disks (RAID) configuration in accordance with an alternative exemplary embodiment of the invention. The method 400 may include detecting a disk drive received via insertion of the disk drive in a first disk drive slot of an enclosure of the RAID configuration, said first disk drive slot having not previously been occupied by a configured disk drive 402. In exemplary embodiments, when the insertion is a cold insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration, said disk drive having been configured when it occupied the second disk drive slot and said removal having been a hot removal, the method 400 may further include providing a message to a user, said message requesting that the received disk drive be removed 404.

In further embodiments, when the insertion is a cold insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration, said disk drive having been configured when it occupied the second disk drive slot and, when said removal had been a hot removal, the method 400 may further include preventing boot up and entry into a configuration utility until the received disk drive is removed 406.

In exemplary embodiments, when the insertion is a hot, pre-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration and, when said disk drive had been configured when it occupied the second disk drive slot, the method 400 may further include allowing functioning of a configuration utility with the configured disk drives 408. In further embodiments, when the insertion is a hot, pre-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration, and, when said disk drive had been configured when it occupied the second disk drive slot, the method 400 may further include providing a user input prompt message, said message requesting a drive rebuild input or a drive removal input 410.

In additional embodiments, when the insertion is a hot, post-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive had been removed from a second disk drive slot of the enclosure of the RAID configuration, and, said disk drive having been configured when it occupied the second disk drive slot, the method 400 may further include marking the disk drive as unconfigured good 412. In exemplary embodiments, when a maximum number of supported disk drives are configured, but less than the maximum number of supported disk drives are in place, and when the insertion is a cold insertion, the method 400 may further include providing a message to a user, said message requesting that the received disk drive be removed 414.

In further embodiments, when a maximum number of supported disk drives are configured, but less than the maximum number of supported disk drives are in place, and when the insertion is a cold insertion, the method 400 may further include preventing boot up and entry into a configuration utility until the received disk drive is removed 416. In additional embodiments, when a maximum number of supported disk drives are configured, but less than the maximum number of supported disk drives are in place, and when the insertion is a hot, pre-boot insertion, the method 400 may further include allowing functioning of a configuration utility with the configured disk drives 418.

In exemplary embodiments, when a maximum number of supported disk drives are configured, but less than the maximum number of supported disk drives are in place, and when the insertion is a hot, pre-boot insertion, the method 400 may further include providing a user input prompt message, said message requesting a drive rebuild input or a drive removal input 420. In further embodiments, when a maximum number of supported disk drives are configured, but less than the maximum number of supported disk drives are in place, and when the insertion is a hot, post-boot insertion, the method 400 may further include marking the received disk drive as unconfigured good 422.

In alternative embodiments, when a maximum number of supported disk drives are configured, but less than the maximum number of supported disk drives are in place, and when an additional new drive is inserted in a slot that had previously been occupied by a configured drive, whether the insertion is a cold insertion, a hot, pre-boot insertion or a hot, post-boot insertion, the new drive may be marked as FAIL or RBLD based on an Auto-Rebuild flag and based on size (ex—storage capacity) of the inserted drive.

In further embodiments, hot removal of a configured drive may trigger a state change in any affiliated logical disk(s). Further, exiting Ctrl-M may result in a system reboot. During pre-boot, system behavior may be controlled by BIOS and Ctrl-M management tool. During post-boot, system behavior may be controlled by MegaSR and MSM management tool. In exemplary embodiments, an in-place drive may be defined as a drive which is physically present in an enclosure slot. A configured drive may be a drive that has been recognized as being in-place, but may or may not have been written with some form of DDF configuration. A configured drive does not necessarily have to be in-place. An unusable drive is a drive which may be in-place but may not be able to be discovered/may not be configured. Further, an un-configured disk may be a physical disk which is part of a configuration but has not been committed to virtual disk. Unconfigured disks may be used to create new disks, convert to hot spare, etc. An array may be a simple collection of disks which may be used to create logical drives. Many logical drives may fit into a single array. Also, a logical drive may have more than one constituent array. Still further, a failed disk is a disk which may/may not be physically present, but may nevertheless have a logical presence. A failed disk may result from physically removing a disk from a virtual disk array or may result from using a management tool to force a drive to transition to this state. In exemplary embodiments, for RAID BIOS and pre-boot configuration utility, failed drives may be shown to a user via a GUI by a "FAILED" tag. In further embodiments, OS RAID management tools may not display the drives which have been physically remove, but may show the drives which have been forced to offline state. Whether or not such drives are visible via a GUI, driver and BIOS may carry this drive state around as part of their soft state for various reasons.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for handling disk drives in a Redundant Array of Inexpensive Disks (RAID) configuration, comprising:
    detecting a disk drive received via insertion of the disk drive in a disk drive slot of an enclosure of the RAID configuration;
    when the insertion is a cold insertion into an empty disk drive slot, and when prior to the disk drive being received in the disk drive slot, fewer than a maximum number of supported disk drives are configured and, when after the disk drive is received in the disk drive slot, no more than the maximum number of supported drives are in-place, marking the disk drive received in the disk drive slot as Un-configured good alias Ready;
    when the insertion is a cold insertion into a missing disk drive slot, and when prior to the disk drive being received in the disk drive slot, fewer than a maximum number of supported disk drives are configured and, when after the disk drive is received in the disk drive slot, no more than the maximum number of supported drives are in-place, and when the inserted disk drive is smaller storage capacity than a storage capacity of a replaced disk drive which was previously in-place within the missing disk drive slot, marking the inserted disk drive as FAIL; and
    when the insertion is a cold insertion into a missing disk drive slot, and when prior to the disk drive being received in the disk drive slot, fewer than a maximum number of supported disk drives are configured and, when after the disk drive is received in the disk drive slot, no more than the maximum number of supported drives are in-place, and when the inserted disk drive has a same storage capacity or larger storage capacity than a replaced disk drive which was previously in-place within the missing disk drive slot, marking the inserted disk drive as FAIL or RBLD based on an Auto Rebuild flag.

2. A method as claimed in claim 1, further comprising:
    when the insertion is a hot, pre-boot insertion or a hot, post-boot insertion into an empty disk drive slot, and when prior to the disk drive being received in the disk drive slot, fewer than a maximum number of supported disk drives are configured and, when after the disk drive is received in the disk drive slot, no more than the maximum number of supported disk drives are in-place, marking the inserted disk drive as Un-configured good.

3. A method as claimed in claim 1, further comprising:
    when the insertion is a hot, pre-boot insertion into a missing disk drive slot, and when prior to the disk drive being received in the disk drive slot, fewer than a maximum number of supported disk drives are configured and, when after the disk drive is received in the disk drive slot, no more than the maximum number of supported drives are in-place, marking the inserted disk drive as FAIL or RBLD based on an Auto Rebuild flag.

4. A method as claimed in claim 1, further comprising:
    when the insertion is a cold insertion, and when prior to the disk drive being received in the disk drive slot, a maximum number of supported disk drives are configured and in-place within the enclosure, providing a message to a user, said message requesting that the received disk drive be removed from the disk drive slot; and
    preventing boot up and entry into a configuration utility until the received disk drive is removed from the disk drive slot.

5. A method as claimed in claim 1, further comprising:
    when the insertion is a hot, pre-boot insertion, and when prior to the disk drive being received in the disk drive slot, a maximum number of supported disk drives are configured and in-place within the enclosure, allowing functioning of a configuration utility with the configured disk drives.

6. A method as claimed in claim 1, further comprising:
    when the insertion is a hot, post-boot insertion, and when prior to the disk drive being received in the disk drive slot, a maximum number of supported disk drives are configured and in-place within the enclosure, preventing use of the received drive in the disk drive slot and providing a message to a user that more disk drives are present in the RAID configuration than are supportable by the RAID configuration.

7. A method as claimed in claim 1, further comprising:
    when the insertion is a hot, pre-boot insertion, and when prior to the disk drive being received in the disk drive slot, a maximum number of supported disk drives are configured and in-place, an additional unusable disk drive is in-place, and a disk drive included in the configured disk drives is removed, providing a message to a user, said message requesting that the received disk drive be removed from the disk drive slot; and
    preventing boot up and entry into a configuration utility until the received disk drive is removed.

8. A method as claimed in claim 1, further comprising:
when the insertion is a hot, pre-boot insertion or a hot, post-boot insertion, and when prior to the disk drive being received in the disk drive slot, a maximum number of supported disk drives are configured and in-place, an additional unusable disk drive is in-place, and a disk drive included in the configured disk drives is removed, marking the received disk drive in the disk drive slot as unconfigured good.

9. A method for handling disk drives in a Redundant Array of Inexpensive Disks (RAID) configuration, comprising:
detecting a disk drive received via insertion of the disk drive in a first disk drive slot of an enclosure of the RAID configuration, said first disk drive slot having not previously been occupied by a configured disk drive; and
when the insertion is a cold insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive in the first disk drive slot had been removed from a second disk drive slot of the enclosure of the RAID configuration, said disk drive received in the first disk drive slot having been configured when it occupied the second disk drive slot and said removal having been a hot removal, providing a message to a user, said message requesting that the received disk drive in the first disk drive slot be removed.

10. A method as claimed in claim 9, further comprising:
when the insertion is a cold insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive in the first disk drive slot had been removed from a second disk drive slot of the enclosure of the RAID configuration, said disk drive received in the first disk drive slot having been configured when it occupied the second disk drive slot and when said removal had been a hot removal, preventing boot up and entry into a configuration utility until the received disk drive in the first disk drive slot is removed.

11. A method as claimed in claim 9, further comprising:
when the insertion is a hot, pre-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive in the first disk drive slot had been removed from a second disk drive slot of the enclosure of the RAID configuration, and when said disk drive received in the first disk drive slot had been configured when it occupied the second disk drive slot, allowing functioning of a configuration utility with the configured disk drives.

12. A method as claimed in claim 9, further comprising:
when the insertion is a hot, pre-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive in the first disk drive slot had been removed from a second disk drive slot of the enclosure of the RAID configuration, and when said disk drive received in the first disk drive slot had been configured when it occupied the second disk drive slot, providing a user input prompt message, said message requesting a drive rebuild input or a drive removal input.

13. A method as claimed in claim 9, further comprising:
when the insertion is a hot, post-boot insertion, and, when prior to the disk drive being received in the first disk drive slot, a maximum number of supported disk drives had been configured in the RAID configuration, but less than the maximum number of supported disk drives had been in-place in the RAID configuration, and, when prior to the disk drive being received in the first disk drive slot, said received disk drive in the first disk drive slot had been removed from a second disk drive slot of the enclosure of the RAID configuration, and said disk drive received in the first disk drive slot having been configured when it occupied the second disk drive slot, marking the disk drive received in the first disk drive slot as unconfigured good.

14. A method as claimed in claim 9, further comprising:
when a maximum number of supported disk drives are configured, but less than the maximum number of supported disk drives are in place, and when the insertion is a cold insertion, providing a message to a user, said message requesting that the received disk drive in the first disk drive slot be removed.

15. A method as claimed in claim 9, further comprising:
when a maximum number of supported disk drives are configured, but less than the maximum number of supported disk drives are in place, and when the insertion is a cold insertion, preventing boot up and entry into a configuration utility until the received disk drive in the first disk drive slot is removed.

16. A method as claimed in claim 9, further comprising:
when a maximum number of supported disk drives are configured, but less than the maximum number of supported disk drives are in place, and when the insertion of the disk drive into the first disk drive slot is a hot, pre-boot insertion, allowing functioning of a configuration utility with the configured disk drives.

17. A method as claimed in claim 9, further comprising:
when a maximum number of supported disk drives are configured, but less than the maximum number of supported disk drives are in place, and when the insertion of the disk drive into the first disk drive slot is a hot, pre-boot insertion, providing a user input prompt message, said message requesting a drive rebuild input or a drive removal input.

18. A method as claimed in claim 9, further comprising:
when a maximum number of supported disk drives are configured, but less than the maximum number of supported disk drives are in place, and when the insertion of the disk drive into the first disk drive slot is a hot, post-boot insertion, marking the received disk drive in the first disk drive slot as unconfigured good.

19. A non-transitory computer-readable medium having computer-executable instructions for performing a method for handling disk drives in a Redundant Array of Inexpensive Disks (RAID) configuration, said method comprising:

detecting a disk drive received via insertion of the disk drive in a disk drive slot of an enclosure of the RAID configuration;

when the insertion is a cold insertion into an empty disk drive slot, and when prior to the disk drive being received in the disk drive slot, fewer than a maximum number of supported disk drives are configured and, when after the disk drive is received in the disk drive slot, no more than the maximum number of supported drives are in-place, marking the disk drive received in the disk drive slot as Un-configured good alias Ready; and when the insertion is a cold insertion into a missing disk drive slot, and when prior to the disk drive being received in the disk drive slot, fewer than a maximum number of supported disk drives are configured and, when after the disk drive is received in the disk drive slot, no more than the maximum number of supported drives are in-place, and when the inserted disk drive has a smaller storage capacity than a storage capacity of a replaced disk drive which was previously in-place within the missing disk drive slot, marking the inserted disk drive as FAIL.

20. A non-transitory computer-readable medium as claimed in claim 19, said method further comprising:

when the insertion is a cold insertion into a missing disk drive slot, and when prior to the disk drive being received in the disk drive slot, fewer than a maximum number of supported disk drives are configured and, when after the disk drive is received in the disk drive slot, no more than the maximum number of supported drives are in-place, and when the inserted disk drive has a same storage capacity or larger storage capacity than a replaced disk drive which was previously in-place within the missing disk drive slot, marking the inserted disk drive as FAIL or RBLD based on an Auto Rebuild flag.

* * * * *